United States Patent

Terreni

[15] 3,672,086
[45] June 27, 1972

[54] DEMOUNTABLE FISHING LURE WITH INTERCHANGEABLE ELEMENTS

[72] Inventor: Giansandro Terreni, Via Montesanto, Luino, Italy

[22] Filed: Feb. 4, 1970

[21] Appl. No.: 8,611

[52] U.S. Cl............................43/42.09, 43/42.13, 43/42.17, 43/42.22, 43/42.39, 43/43.14
[51] Int. Cl. .......................................................A01k 85/00
[58] Field of Search ...............43/42.09, 42.12, 42.13, 42.14, 43/42.16, 42.19, 42.2, 42.47, 42.17, 42.39, 43.14

[56] References Cited

UNITED STATES PATENTS

| | | | |
|---|---|---|---|
| 2,588,300 | 3/1952 | Smith | 43/42.09 |
| 2,586,141 | 2/1952 | Angell | 43/42.14 |
| 3,488,877 | 1/1970 | Carabasse | 43/42.17 X |
| 2,206,274 | 7/1940 | Wiberg | 43/42.19 X |
| 2,674,059 | 4/1954 | Hayden | 43/42.09 |
| 3,500,576 | 3/1970 | Ostrom | 43/42.39 X |

FOREIGN PATENTS OR APPLICATIONS

| | | | |
|---|---|---|---|
| 2,001,178 | 9/1969 | France | 43/42.09 |
| 14,689 | 1910 | Great Britain | 43/42.46 |
| 830,549 | 5/1938 | France | 43/42.17 |

*Primary Examiner*—Samuel Koren
*Assistant Examiner*—George M. Yahwak
*Attorney*—Browdy and Neimark

[57] ABSTRACT

An artificial fishing lure is disclosed, which can be variously transformed by inserting or removing some parts thereof. This fishing lure essentially comprises a central frame to which various spoon baits, sinkers, blades, fish hooks and the like can be connected. Said central frame consists of a main body with a central longitudinal slot, two pairs of opposite projections, an upper connection member for attachment to the fishing line and a lower fastener means for securing the fishing hook and the like.

6 Claims, 4 Drawing Figures

PATENTED JUN 27 1972   3,672,086

INVENTOR
Giansandro Terreni
BY Browdy and Neimark
ATTORNEYS

DEMOUNTABLE FISHING LURE WITH INTERCHANGEABLE ELEMENTS

BACKGROUND OF THE INVENTION

This invention relates to fishing lures, and particularly to a fishing lure which can be transformed at will by inserting or removing some parts thereof, so that to be universally used for fishing when attached to long handlines and casting lines.

It is known that those who practise fishing with these types of lines must be supplied with a plurality of artificial lures of different weight, size, shape and color according to the kind of fish to be captured, velocity and depth of water, environnement, type of fishing line and many other factors.

Such an equipment is obviously expensive and involves continuous replacements of the bait. Additionally, when a lure is being lost, as it often occurs, there are no others exactly alike ready for substitution.

SUMMARY OF THE INVENTION

It is an object of this invention to provide an artificial fishing lure which can be used in any circumstance or environmental condition, attached to long handlines or casting lines.

It is another object of the present invention to provide a demountable, transformable fishing lure, so as to prevent the necessity for a fisher to be supplied with a lot of different types of artificial baits.

Additionally, it is a further object of the present invention to provide a fishing lure, parts of which can be readily removed or inserted according to the requirements.

The fishing lure according to this invention is generally comprised of a particular articulated frame provided with a plurality of connections for removably fastening thereto one or more spoon baits of any shape and weight and sinkers of various type according to the fisher's need.

BRIEF DESCRIPTION OF THE DRAWING

These and other objects and features of the present invention will be apparent to those skilled in the art from the following detailed description of one embodiment thereof with reference to the accompanying drawings in which.

DETAILED DESCRIPTION OF THE PREFERRED EMBODIMENT

Figure 1:
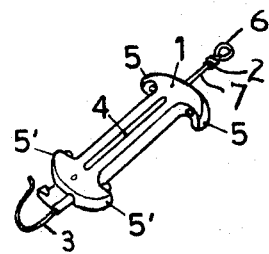
FIG. 1 shows a perspective view of one embodiment of the central frame of the fishing lure according to the present invention.

With reference to FIG. 1, there is seen that the central frame of the fishing lure according to this invention substantially comprises a main body 1 having at the ends two pairs of opposite side projections symmetrically and outwardly directed 5, 5'. The body 1 is also provided with a central slot 4 in which one or more adapted blades can be inserted.

The two pairs of projections 5, 5' are designed to vertically secure therebetween one or more sinkers of cylindrical, semi-cylindrical or similar shape, containing ballast.

The body 1 is also provided with an upper connection member 2 having an eyelet 6 for tying the whole fishing lure to the line and a pin 7 which is useful for fitting the spoon baits connecting device. The main body 1 is additionally provided with a lower snap-locking fastener 3 for connecting the fish hook and if that is the case, the hook covering elements. It is to be understood that the main body 1 can be made of any suitable material. However, it is preferred to employ plastic material by which such main body can be readily manufactured with advantage, e.g. by molding.

Figure 2:
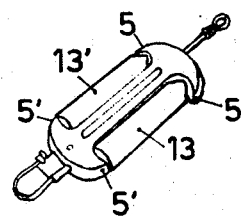
FIG. 2 shows the central frame of FIG. 1 wherein two containers for ballast are inserted.

With reference to FIg. 2, it can be seen how two ballast containers 13, 13' have been fitted between the two pairs of opposite side projections 5, 5'.

Figure 3:
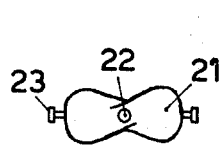
FIG. 3 shows a plan view of a connecting device for spoon baits.

With reference to FIG. 3, an embodiment of the spoon baits connecting device is shown, which essentially consists of a helicoidal blade 21 having centrally disposed a hole 22 and at the ends two connections 23. The central hole 22 is provided with a small undercut which allows the blade 87 member 21 to be mounted laterally on the pin 7 of the upper connection member 2. The connections 23 are adapted to insert the spoon baits therein.

It is to be appreciated that the blade member 21, having a propeller shape, affords the advantage to undertake a rotatory movement when is dipped in water, such rotatory movement being also transmitted to the spoon baits connected to said member 21. It is to be understood that the use of the blade member 21 is fully reliable also when no spoon bait is to be attached thereto and is particularly recommended in the cases when the blade inserted in the slot 4 of the main body 1 is not of propeller-type.

Figure 4:
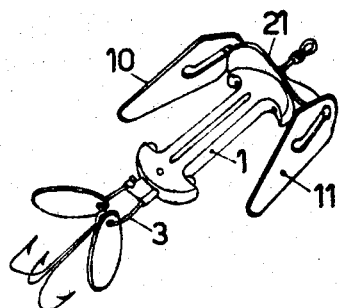
FIG. 4 shows a perspective view of the central frame of FIG. 1 on which the connecting device of FIG. 3 has been inserted.

With reference to FIG. 4, there can be seen the central frame with the propeller blade element 21 and two spoon baits 10 and 11 attached thereto. A fish hook (in the figure a triangle) and two hook covering elements are secured by the fastener device 3, herein represented in locked position.

It is to be understood that the embodiments described in the above specification and illustrated in the annexed drawings are intended by way of example and in non-limiting sense of the inventions. Additions and/or modifications can be contributed by those skilled in the art without exceeding the scope of the appended claims.

What I claim is:

1. An artificial fishing lure to be attached to long hand-lines and casting lines, comprising:
   a. a main body having a central longitudinal slot;
   b. means to hold a pair of weights alongside and parallel to said main body comprising two pairs of opposite side projections extending outwardly from said main body, each pair being adapted to hold an elongated weight member;
   c. a forward connection member; and
   d. a rearward fastener means.

2. The fishing lure of claim 1, further comprising a propeller blade shaped member mounted on said forward connection member.

3. The fishing lure of claim 2, wherein said propeller blade shaped member is provided at both its ends with integral connection means.

4. The fishing lure of claim 2, wherein said propeller blade shaped member is provided with means for coupling it to said forward connection member.

5. The fishing lure of claim 1, wherein said forward connection member comprises a pin forwardly extending from the forward end of said main body, said pin being provided at the other end with an eyelet element.

6. The fishing lure of claim 1, wherein said two pairs of opposite side projections are each disposed at the end of said main body, forming two substantially crescent shaped members, inwardly bent, and a weight member removably fitted and held between each pair of said side projections.

* * * * *